Figure 1:
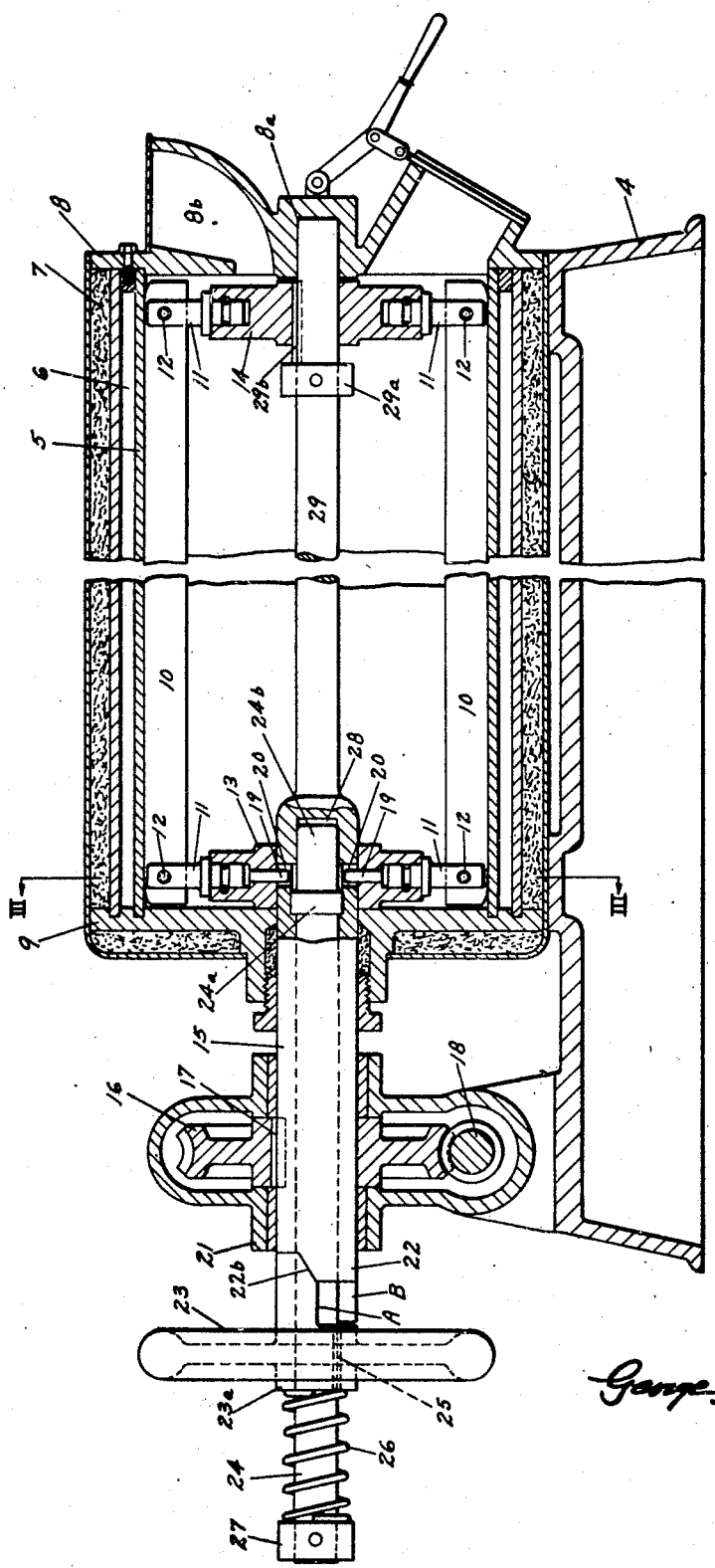

Dec. 22, 1931. G. F. McDOUGALL 1,837,565
ICE CREAM FREEZER
Filed March 13, 1931 2 Sheets-Sheet 1

Inventor
George F. McDougall

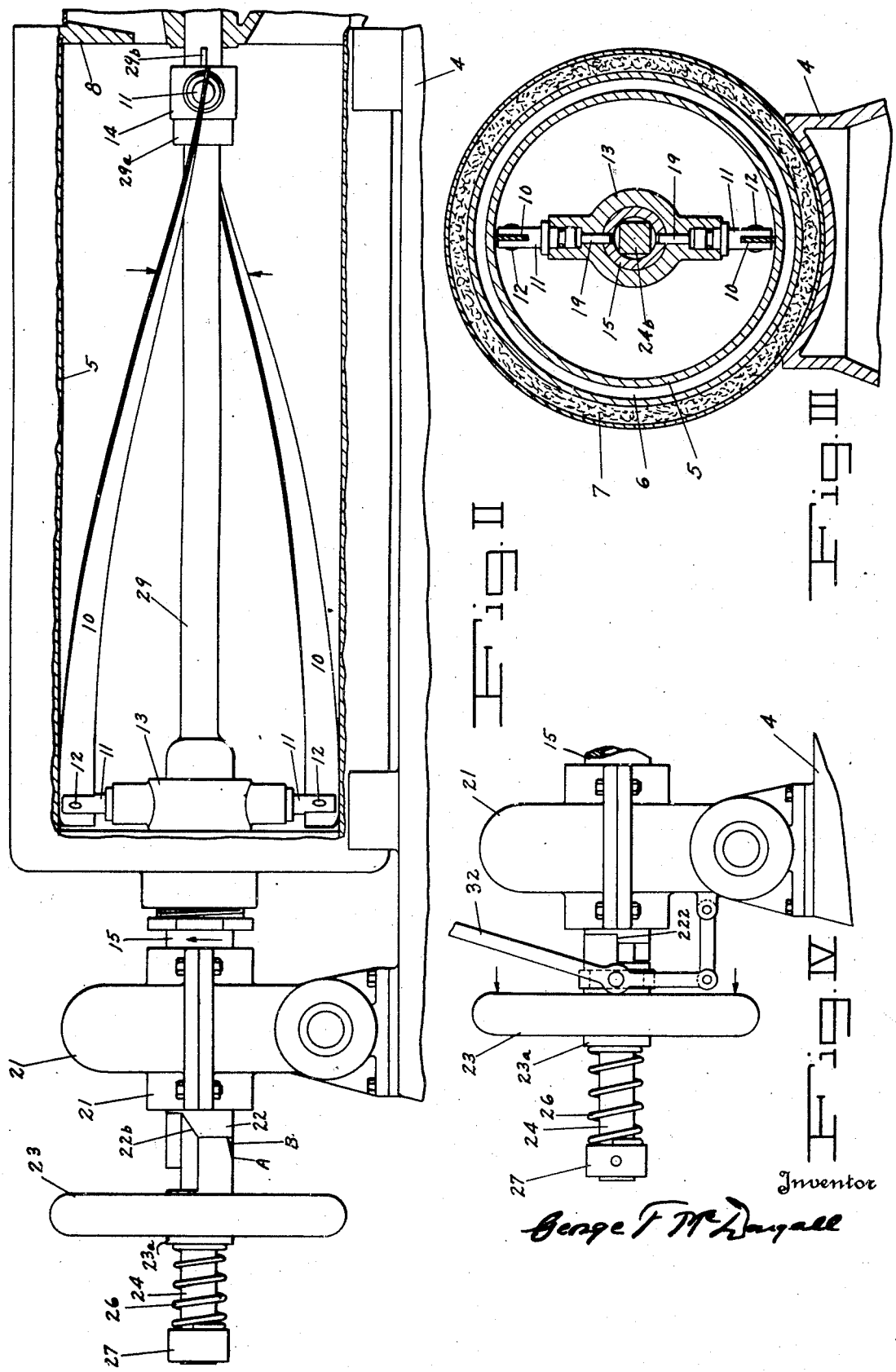

Patented Dec. 22, 1931

1,837,565

UNITED STATES PATENT OFFICE

GEORGE F. McDOUGALL, OF PORTLAND, OREGON

ICE-CREAM FREEZER

Application filed March 13, 1931. Serial No. 522,225.

My invention relates to that type of ice cream freezer which has a cylindrical freezing chamber provided with means for refrigeration and having a power driven agitator element on the inside.

The functions of the agitator in such a freezer are dual in nature. These freezers are essentially batch freezers, that is to say a certain quantity of mix is placed in them, frozen and then ejected. It is highly desirable in order to sufficiently aerate the mix and to prevent sharp particles of ice from forming therein during congelation that it be beaten rapidly and kept in a constant state of agitation while being frozen. To serve this purpose a straight bladed beater element is by far the best as one having a spiral strike of the blades will invariably tend to throw the mix to one end of the cylinder with the result that the comparatively small quantity contained in the other end starts to congeal first, to the detriment of the whole operation.

It is therefore desirable to have a beater for the cylinder, the blades of which will be parallel to the axis of the cylinder until the mix has stiffened to a point where it is desirable to eject it and then to have the blades instantly assume a spiral or worm like form for the purpose of ejecting the frozen mix without stopping the element.

The objects of my invention are to supply a mechanism that will conform to the above requirements, present no mechanical difficulties in construction and have a beater element that while it discharges all of the above functions has no complicated parts that are difficult to clean, in contact with the mixture to be frozen. These and other objects that will be apparent from the following specification and claims constitute the purposes of my present invention.

The following drawings accompany and form a part of this specification and are by way of an operative illustration and disclosure of the principles embodied in my new invention, in which,—

Fig. I is a longitudinal sectional elevation of a form of my new invention showing the beater blades straight, that is to say parallel with the axis of the freezing cylinder;

Fig. II is a partial view from the same direction partly in section and showing the blades after they have assumed their spiral shape;

Fig. III is a section taken at III—III, Fig. I; and

Fig. IV is an alternative construction of the stepover clutch hereinafter more completely described.

In Fig. I, a base, 4, supports a cylinder, 5, having a refrigerant space, 6, insulation, 7, a front head, 8, and a back head, 9.

The beater in this case consists of flexible blades, 10, which are shown here to be two in number, though a number of blades greater than two may be used, and as they are alike the same numeral has been used in their designation. These blades are made preferably of tempered material that will stand a considerable bending without taking a permanent set or breaking and can best be constructed from the comparatively new but now well known material which may be conveniently designated as rust resisting steel; though it is possible for other metals such as monel metal to be used if the spiraling twist to which they are subjected is not too great. The blades, 10, are supported in a forked carrier, 11, at each end, to which they are attached by fastenings, 12, which may conveniently be rivets. The carriers, 11, of which there are two to each blade, are shown here to be swiveled in the spider, 13, at the back end and the spider, 14, at the front or delivery end. The spider, 13, is mounted upon the hollow shaft, 15, upon which is fixed the worm wheel, 16, positively held by the key, 17.

The worm wheel, 16, is driven by the worm, 18, which takes power from any convenient source, not shown.

A positive motion from the hollow shaft, 15, is transmitted to the spider, 13, through the pins, 19, which engages the slots, 20, in the end of the hollow shaft, 15.

Thus when the spider, 13, is mounted upon the hollow shaft, 15, a fixed relation is established as to time and direction of rotation which will be the same in all cases as that of the worm wheel, 16. On the end of the hollow shaft, 15, that projects through the worm gear case, 21, is formed one-half of a stepover clutch designated by the numeral 22, on the hollow shaft, the other half of the clutch being formed on and preferably a part of the hand wheel, 23.

The hand wheel, 23, is mounted upon the shaft, 24, and is slidable axially thereon and drives the shaft, 24, through the spline, 25, upon which it slides. Bearing against the hub of the hand wheel, 23, designated by the numeral, 23a, is shown a compression spring, 26, held in place by the shaft collar, 27. The compression spring, 26, tends to hold the two members of the stepover clutch in driving position. The shaft, 24, has a shaft collar, 24a, that fits in a counter-bored recess in the hollow shaft, 15, and prevents relative axial movement due to the influence of the spring, 26. That part of the shaft, 24, projecting inside of the freezer is shown here to be square and is designated by the numeral, 24b, and engages the socket, 28, of the shaft, 29; the other end of the shaft, 29, being supported in a bearing, 8a, of the front head, 8.

The spider, 14, is slidable axially on the shaft, 29, within the limits permitted by the set collar, 29a. The spline, 29b, makes it take the same revolving movement as the shaft, 29. The operation of the device will now be explained.

It will be assumed that power has been applied to the worm, 18, and that the direction of rotation is that indicated by the arrow on the hollow shaft, 15, shown in Fig. II, that is to say counter-clockwise when looking at the drive end of the machine.

The mix to be frozen will be placed in the machine by the diagrammatic means illustrated at 8b, refrigerant will be presumed to have occupied the space, 6, provided for it, details of which have not been shown as it is no part of my present invention and such means are old and well known in the art.

It will be found by tracing out the corresponding movements of the driven parts that the spider, 13, will take the same counter-clockwise direction of rotation, being positively driven by the hollow shaft, 15, and that it will, through the carriers, 11, impart the same positive rotative movement to the inside end of the blade, 10, inside here being understood to be the end nearest the drive.

The outside end of the shaft, 29, is indirectly driven by motion transmitted through the two parts of the stepover clutch to the hand wheel, 23, thence through the spline, 25, to the shaft, 24, through the squared portion of the shaft, 24b, and the socket, 28, to the shaft, 29; and power from thence transmitted through the spline, 29b, to the spider, 14. Hence so long as the relative positions of the stepover clutch, 22, and the hand wheel, 23, are unchanged its direction and speed will be the same as that of the spider at the inside end and the blades will remain straight.

When the mix has stiffened to a degree that will produce an amount of force (indicated by the arrows in Fig. II) against the blades, 10, (as indicated in Fig. II) that will be sufficient to overcome the friction offered by the stepover clutch, 22, and the force afforded by the compression spring, 26, by opposing the revolving of the blades, 10, then the stepover clutch, 22, will abruptly snap over from its first to its second position and the hand wheel will meanwhile be forced against the compression spring until the stepover clutch, 22, is clear out of engagement with the first position as shown in Fig. I. Whereupon the hand wheel, 23, will stop for an instant until the surfaces indicated by A and B, Fig. I, are in contact as shown in Fig. II, which will again afford a positive drive, and the spider, 14, will then be a fraction of a revolution, which may well be a quarter of a revolution, behind the spider, 13, and the blades, 10, will then assume the spiral shape shown in Fig. II which will tend as a worm to throw the contents of the freezer toward the outlet opening, 30, in the outside end of the machine.

It will be seen that the degree of stiffness of the mix required to throw the blades, 10, into a spiral position, is largely a function of the strength of the compression spring, 26, the degree of which may be regulated by movement of the collar, 27. This describes the automatic operation of the device and it will invariably tend to throw the blades, 10, into a spiral whenever the stiffness of the mix overcomes the springiness of the blades, 10, themselves, the friction of the stepover clutch, 22, and the strength of the spring, 26.

Should it be desired that the throwing of the blades into spiral position be made manual instead of automatic it is only necessary that the diagonal-contact surface, 22b, of the stepover clutch, 22, as shown in Fig. I, be made straight as shown in Fig. IV at 222, and that a suitable hand lever, 32, or merely a slight pressure with the fingers in a direction indicated by the arrows in Fig. IV against the hand wheel, 23, shall serve as a means for accomplishing the stepover movement of the clutch.

Since that portion of the ends of the blades, 10, between the ends of the blades themselves and the fastenings, 12, is not deflected by the relative movement of the spiders, 13 and 14, it will be necessary to slightly round the corners of the blades, 10, so they will not have a tendency to dig into the inner surface of the cylinder, 5; that is, provided that the beater element as a whole is made to a reasonably close fit.

Many construction details that are well known are illustrated but not described as the precise form shown is not essential, and it has been the intention to confine the description to what is new so that any one skilled in the art could make and use my new invention.

I do not intend to limit myself by the illustration nor by the specification which merely is a part of the disclosure embodied in the drawings, but what is claimed as new and sought to be secured to me by Letters Patent, is,—

1. In an ice cream freezer, a refrigerated cylinder, a rotative beater element for said cylinder within the same, a plurality of flexible blades for said beater element, mountings for opposite ends of said blades, shaft drives for said mountings being a direct drive for one mounting and an indirect drive for the other mounting of said beater, and a stepover clutch mechanism between the two said shafts to spiral the blades under the influence of pressure on said blades induced by congealing of a contained mix.

2. In an ice cream freezer, a refrigerated cylinder, a rotative beater element for said cylinder within the same, a plurality of flexible blades for said beater element, mountings for opposite ends of said blades, shaft drives for said mountings being a direct drive for one mounting and an indirect drive for the other mounting of said beater, and a stepover clutch mechanism between the two said shafts to spiral the blades and means for operating the said stepover clutch.

3. In an ice cream freezer, a refrigerated cylinder, a rotative beater element for said cylinder within the same, a plurality of flexible blades for said beater element, mountings for opposite ends of said blades, shaft drives for said mountings being a direct drive for one mounting and an indirect drive for the other mounting of said beater, and a stepover clutch mechanism between the two said shafts, means incorporated in the mountings of said blades to swivel said mountings and means for operating the stepover clutch to spiral the said blades.

4. In an ice cream freezer, a refrigerated cylinder, a rotative beater element for said cylinder within the same, a plurality of flexible blades for said beater element, mountings for opposite ends of said blades, shaft drives for said mountings being a direct drive for one mounting, and an indirect drive for the other mounting of said beater, and means for retarding the indirect drive a fractional part of a revolution to spiral the blades.

GEORGE F. McDOUGALL.